(12) United States Patent
Park

(10) Patent No.: US 7,721,404 B2
(45) Date of Patent: May 25, 2010

(54) METHOD OF PRODUCING HONEYCOMB STRUCTURE

(75) Inventor: Kiho Park, Inchon (KR)

(73) Assignees: Hoejung Yang (KR); Bongwoo Lee (KR)

( * ) Notice: Subject to any disclaimer, the term of this patent is extended or adjusted under 35 U.S.C. 154(b) by 1097 days.

(21) Appl. No.: 10/573,532

(22) PCT Filed: Sep. 14, 2004

(86) PCT No.: PCT/KR2004/002325

§ 371 (c)(1),
(2), (4) Date: Mar. 24, 2006

(87) PCT Pub. No.: WO2005/028138

PCT Pub. Date: Mar. 31, 2005

(65) Prior Publication Data

US 2007/0033794 A1    Feb. 15, 2007

(30) Foreign Application Priority Data

Sep. 24, 2003    (KR) .................... 20-2003-0030237

(51) Int. Cl.
*B21D 39/02*    (2006.01)
*B23P 25/00*    (2006.01)
(52) U.S. Cl. ........................ 29/463; 29/458
(58) Field of Classification Search .............. 29/458,
29/463, 423, 469, 418, 896.6, 558, 897; 400/213;
228/160; 425/463, 464; 72/253.1
See application file for complete search history.

(56) References Cited

U.S. PATENT DOCUMENTS 3,617,416 A * 11/1971 Kromrey ................ 156/173
7,603,757 B2 * 10/2009 Choi ........................ 29/463

FOREIGN PATENT DOCUMENTS

| JP | 5-212477 | 8/1993 |
| JP | 9-10871 | 1/1997 |
| JP | 10-244518 | 9/1998 |

OTHER PUBLICATIONS

PCT Statement under Article 19(1); PCT/KR2004/002325; Dated: Dec. 28, 2004; pp. 5,6.
PCT International Preliminary Report on Patentability; PCT/KR2004/002325; Dated: Jul. 22, 2005.
PCT International Search Report; PCT/KR2004/002325; Dated: Oct. 30, 2004.

* cited by examiner

*Primary Examiner*—John C Hong
(74) *Attorney, Agent, or Firm*—Cantor Colburn LLP

(57) ABSTRACT

A method for producing a honeycomb structure is disclosed which includes forming two hexagonal cell metal plates each having uniformly-spaced hexagonal pegs, using a mould and a press, applying a fusing material or strong adhesive to outer surfaces of the hexagonal pegs, and overlapping the metal plates such that surfaces of the metal plates, from which the hexagonal pegs are protruded, face each other, and coupling the metal plates such that adjacent ones of the hexagonal pegs of the metal plates are engaged, thereby producing a honeycomb structure having continuously joined cells.

2 Claims, 7 Drawing Sheets

[FIG. 1]
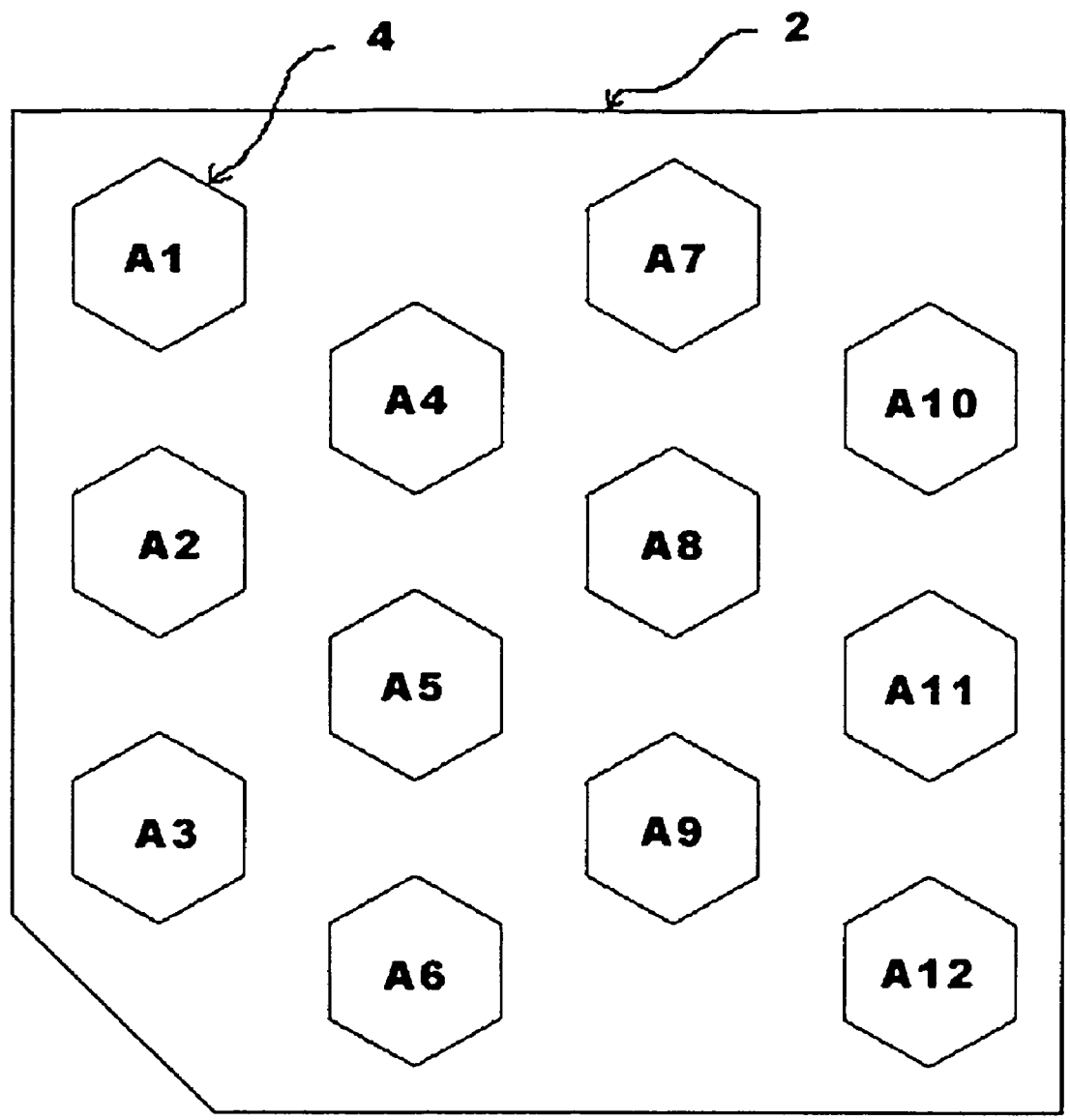

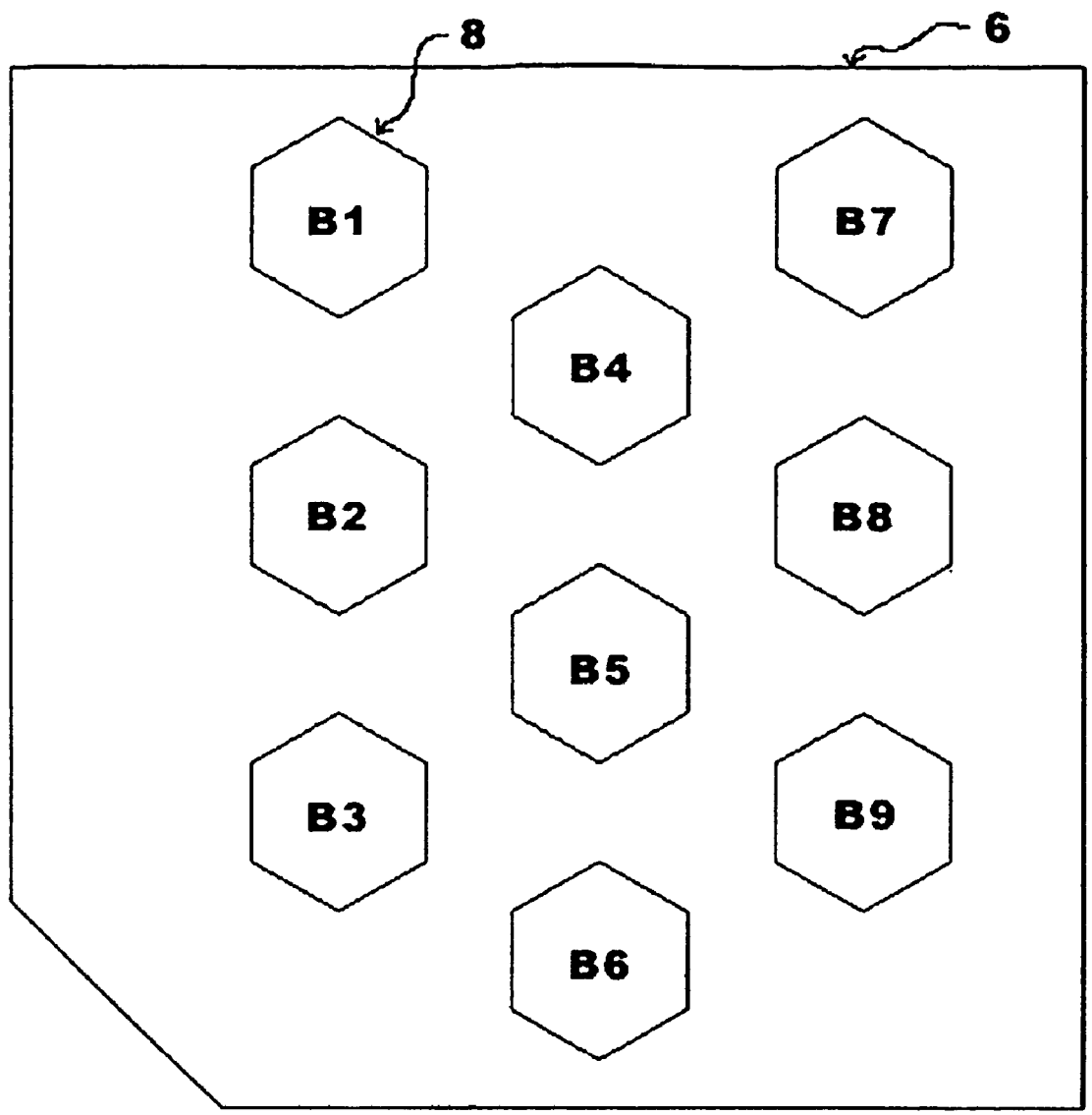
[FIG. 2]

[FIG. 3]
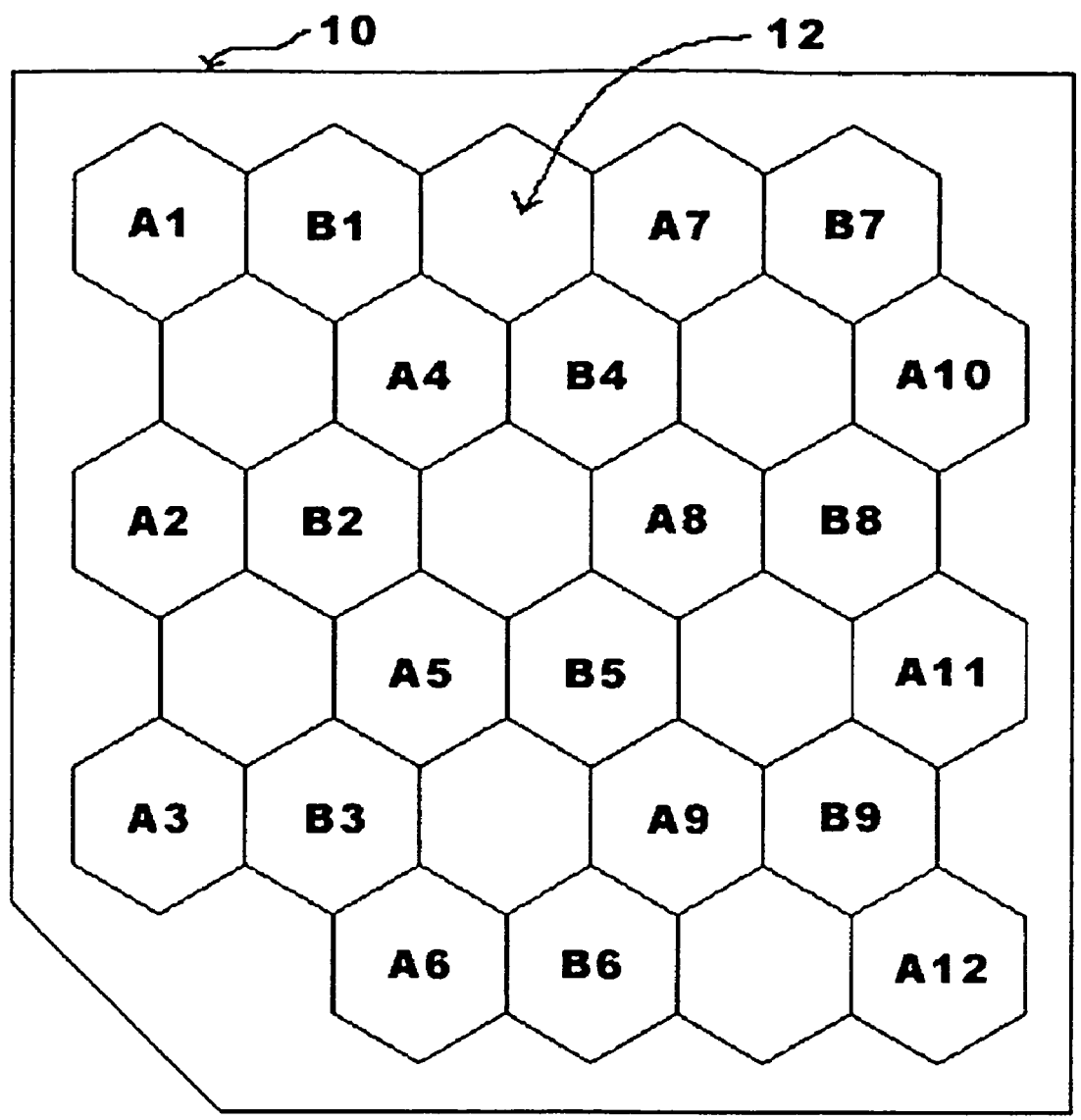

[FIG. 4]
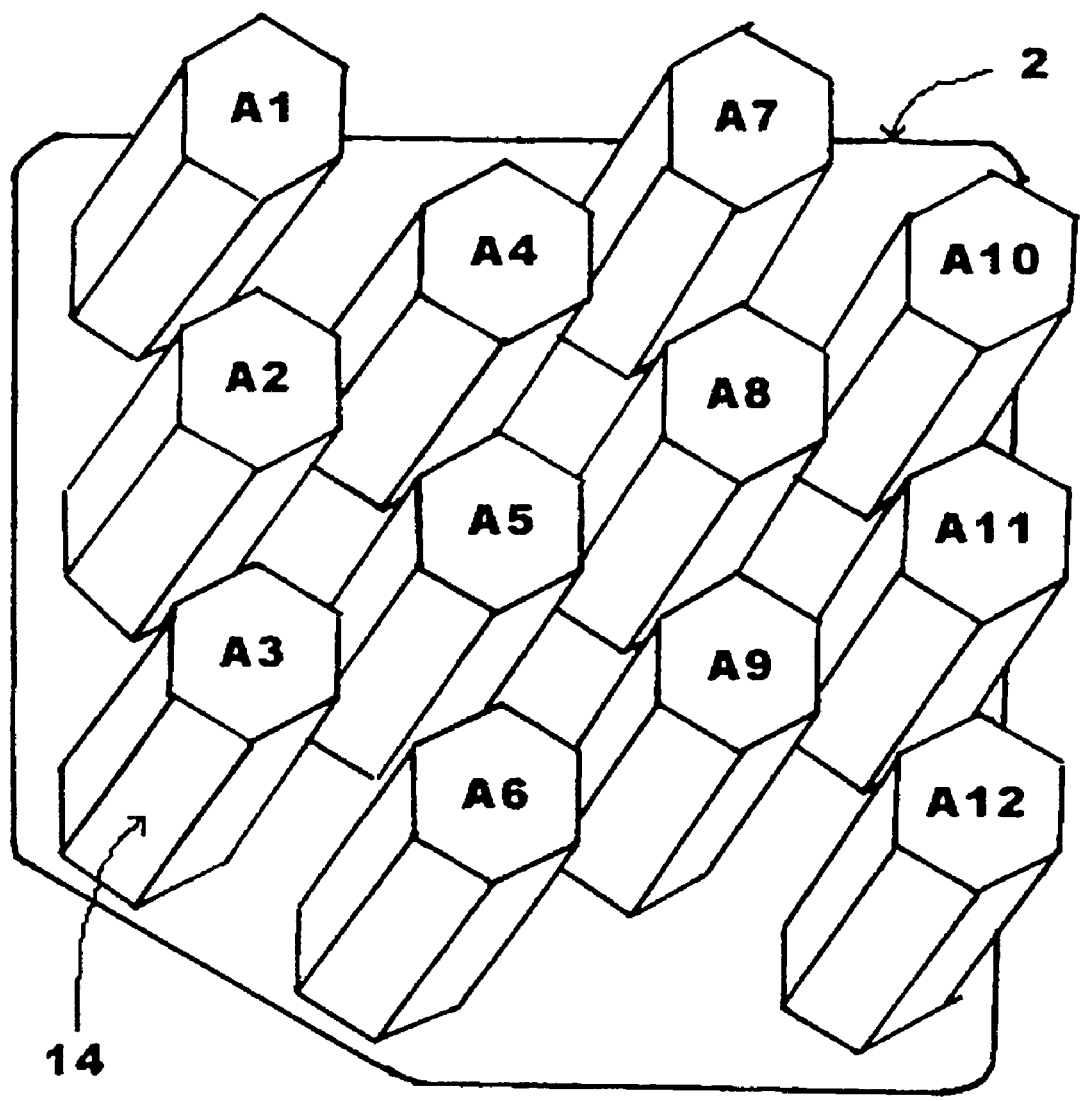

[FIG. 5]
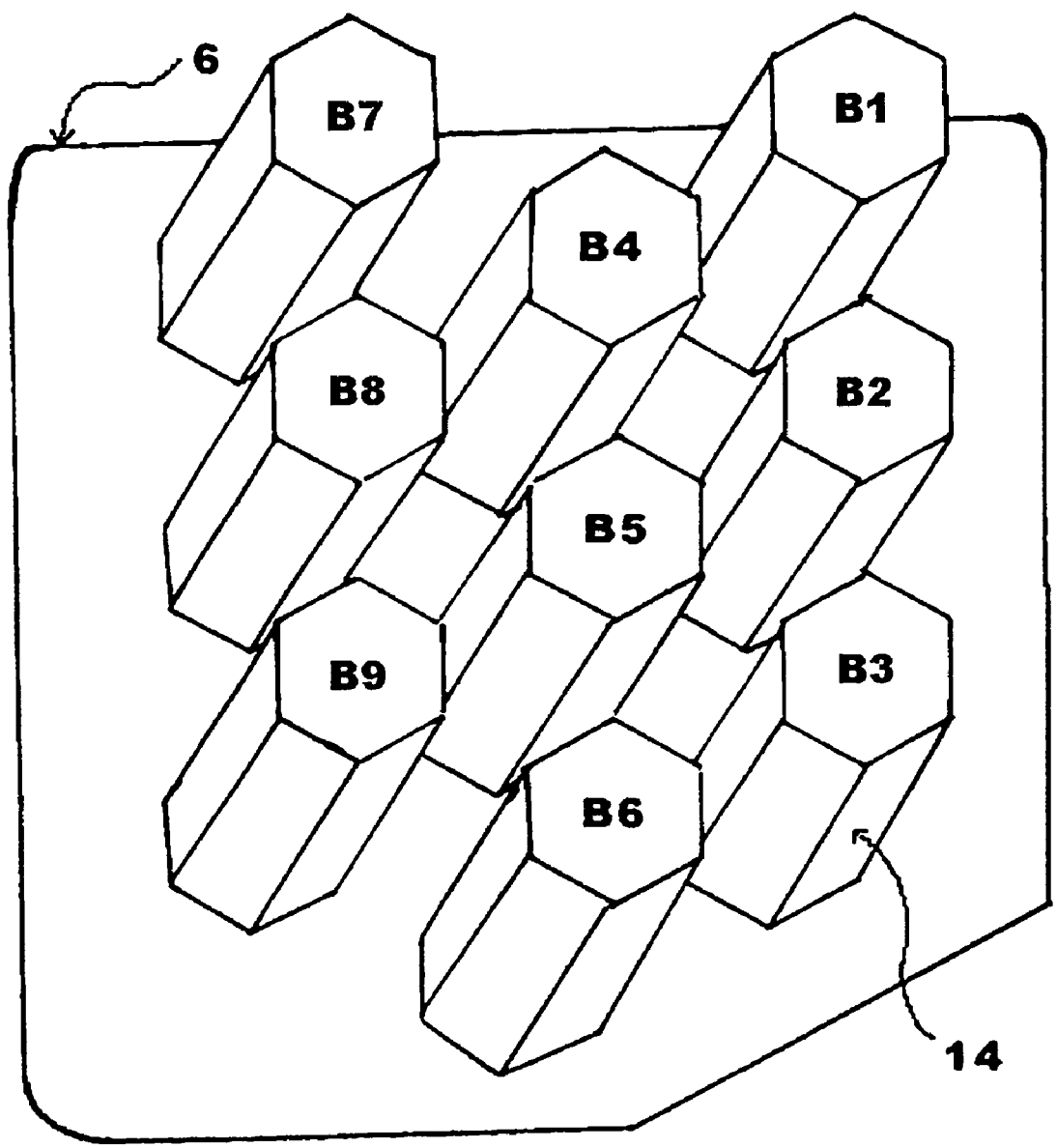

[FIG. 6]
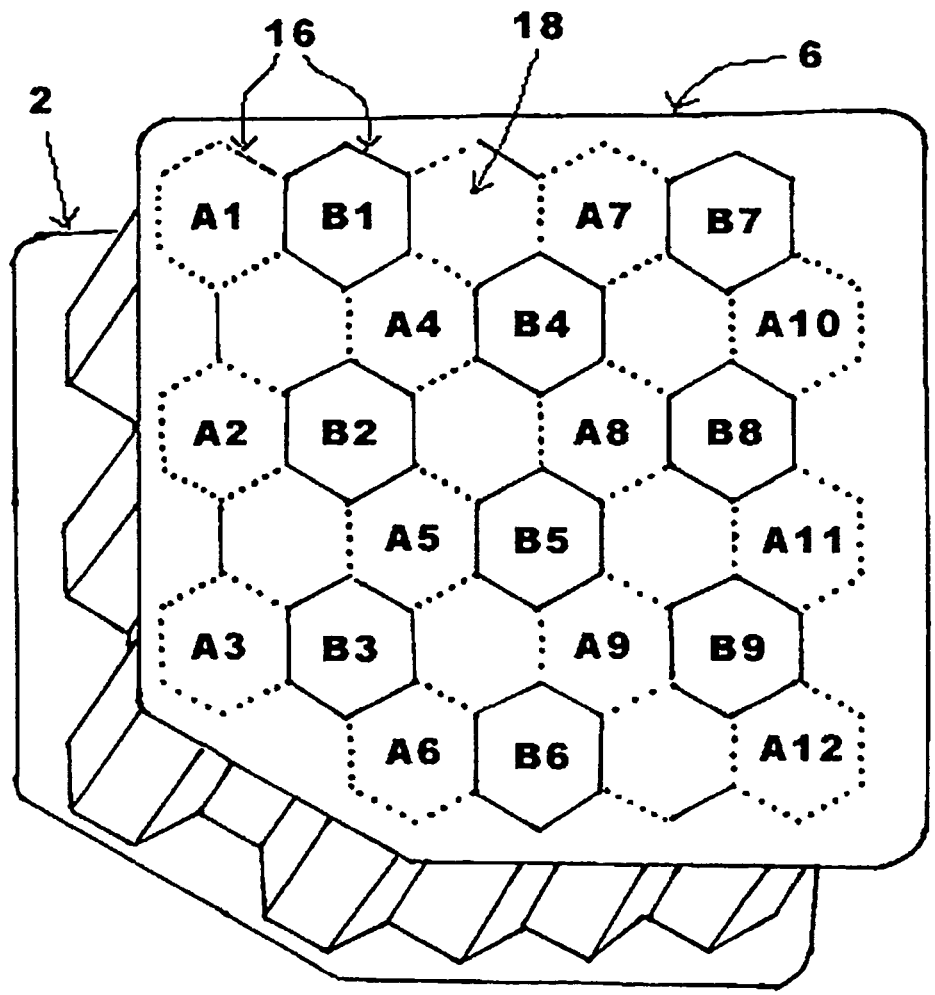
[FIG. 7]
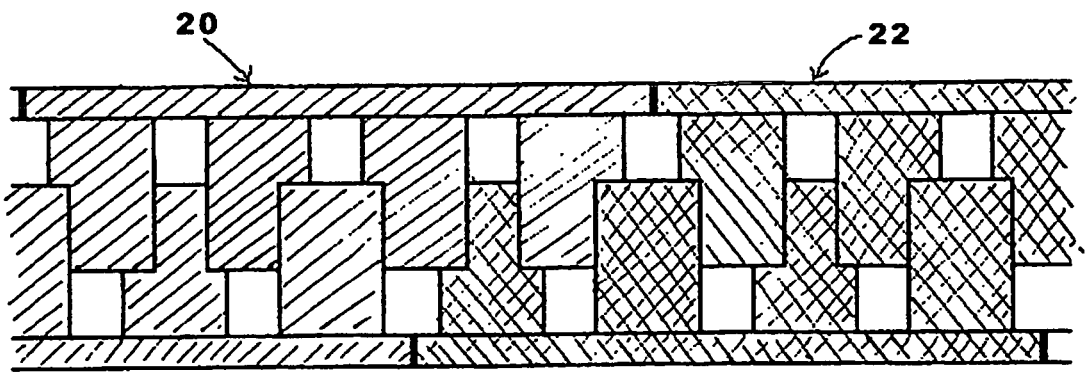

[FIG. 8]
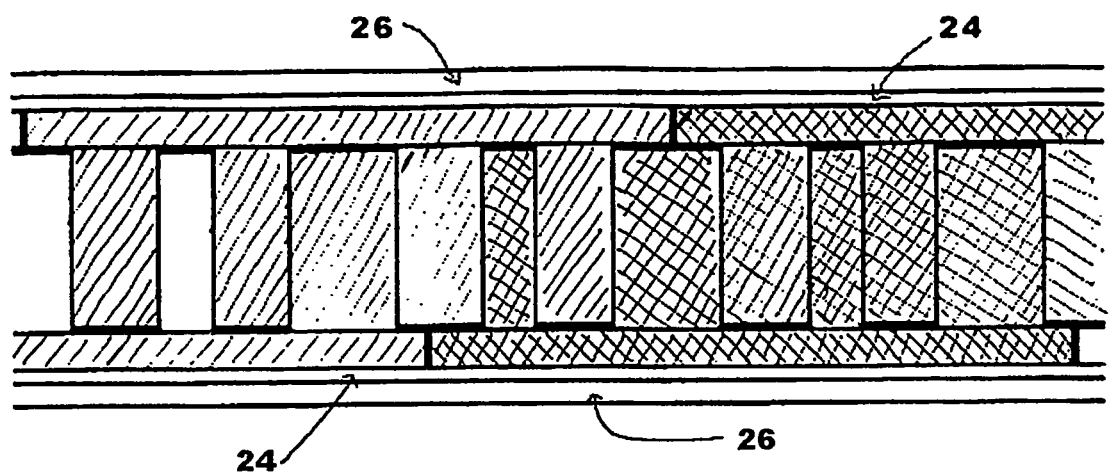

METHOD OF PRODUCING HONEYCOMB STRUCTURE

BACKGROUND OF THE INVENTION

1. Field of the Invention

The present invention relates to a method for producing a honeycomb structure. More particularly, the present invention is concerned with a method of producing a honeycomb structure usable for lightweight construction materials, which involves shaping two metal plates, using a die and a press, in the form of hexagonal cell plates having uniformly-spaced protruded hexagonal pegs, overlapping the shaped hexagonal cell metal plates such that surfaces of the metal plates, from which the hexagonal pegs are protruded, face each other, and bonding the metal plates, thereby producing a honeycomb structure having firmly joined dense cells.

2. Description of the Background Art

In general, honeycomb structures are widely applied for lightweight materials used in structures such as buildings. As is well known, such honeycomb structures are structurally firm.

Such a honeycomb structure is a combination of numerous hexagonal cells in which the hexagonal cells are densely horizontally joined at thin cell boundaries defined by thin walls thereof. For this reason, it is very difficult to form a honeycomb structure, using a die in a single pressing process. Furthermore, it was more difficult to fabricate honeycomb structures, using various metal materials.

SUMMARY OF THE INVENTION

Therefore, the present invention has been made in view of the above problems, and it is an object of the present invention to provide a method of producing a honeycomb structure, which includes shaping two metal plates, using a die and a press, in the form of hexagonal cell plates having protruded hexagonal pegs, overlapping the shaped hexagonal cell metal plates such that surfaces of the metal plates, from which the hexagonal pegs are protruded, face each other, and bonding the metal plates, thereby producing a honeycomb structure having firmly joined dense cells.

In accordance with the present invention, the above object can be accomplished by the provision of a method for producing a honeycomb structure, comprising the steps of: forming two hexagonal cell metal plates each having uniformly-spaced hexagonal pegs, using a die and a press; applying a fusing material or strong adhesive to outer surfaces of the hexagonal pegs; and overlapping the metal plates such that surfaces of the metal plates, from which the hexagonal pegs are protruded, face each other, and coupling the metal plates such that adjacent ones of the hexagonal pegs of the metal plates are engaged, thereby producing a honeycomb structure having continuously joined cells.

According to the present invention, the hexagonal pegs may be substituted with a pentagonal, square, triangular, or circular cross-sectional shape.

BRIEF DESCRIPTION OF THE DRAWINGS

FIG. 1 is a plan view showing the positions of hexagonal cells on a hexagonal cell metal plate A.

FIG. 2 is a plan view showing the positions of hexagonal cells on a hexagonal cell metal plate B.

FIG. 3 is a plan view showing the positions of the hexagonal cells on the metal plates A and B when the metal plate A is overlapped with the metal plate B.

FIG. 4 is a perspective view showing the structure of hexagonal pegs formed at the hexagonal cell metal plate A.

FIG. 5 is a perspective view showing the structure of hexagonal pegs formed at the hexagonal cell metal plate B.

FIG. 6 is a perspective view showing a honeycomb structure fabricated by overlapping the shaped hexagonal cell metal plates A and B.

FIG. 7 is a side view showing a method of increasing the size of the honeycomb structure by joining the shaped hexagonal cell metal plates in the manner of zigzag.

FIG. 8 is a side view showing the state in which flat plates are attached to upper and lower surfaces of the completely-fabricated honeycomb structure.

DETAILED DESCRIPTION OF THE PREFERRED EMBODIMENT

Typically, a honeycomb structure is a combination of numerous hexagonal cells in which the hexagonal cells are densely horizontally joined at cell boundaries defined by thin walls thereof. For this reason, it is very difficult to form such a honeycomb structure, using a die and a press in a single pressing process.

The present invention has been made in view of the above problems, and provides a method for producing a honeycomb structure, which is characterized by preparing moulds each having hexagonal pegs arranged in a low density, shaping metal plates using the moulds such that each of the metal plates has hexagonal pegs corresponding to those of an associated one of the moulds, as shown in FIGS. 4 and 5, and overlapping the shaped metal plates, as shown in FIG. 6, to form a honeycomb structure in which the hexagonal pegs of the shaped metal plates are densely arranged. The honeycomb structure produced as described above in accordance with the present invention is considerably firm, so that the honeycomb structure can be useful for lightweight construction materials.

In accordance with the present invention, as shown in FIGS. 1 and 2, moulds are first prepared which will be used to shape thin metal plates such that each of the metal plates has hexagonal pegs 4 or 8 each constituting a unit cell of a honeycomb structure to be produced. In the honeycomb structure, numerous hexagonal cells must be horizontally joined at cell boundaries defined by thin walls thereof. However, it is very difficult to form such a honeycomb structure, using a single mould in a single pressing process. To this end, in accordance with the present invention, particular moulds are designed, each of which has hexagonal pegs 4 or 8 each spaced apart from one another by an appropriate distance, as shown in FIGS. 1, 2, and 3. The space between adjacent hexagonal pegs and the position of each hexagonal peg in each mould are determined so that, when two metal plates 2 and 6 shaped to have hexagonal pegs 4 or 8 by respective moulds are overlapped with each other, the hexagonal pegs 4 and 8 of the metal plates 2 and 6 are joined in the form of a honeycomb.

Using the moulds prepared as described above, thin metal plates are then shaped. As a result, as shown in FIGS. 4 and 5, each shaped metal plate, that is, the metal plate 2 or 6, has hexagonal pegs 14 each constituting a unit cell of the honeycomb structure to be produced. Thereafter, the two shaped hexagonal cell metal plates 2 and 6 are overlapped such that the protruded surfaces of the metal plates 2 and 6 face each other. Thus, a honeycomb structure is completely produced, as shown in FIG. 6.

In order to enable such a honeycomb structure to be used for lightweight construction materials, the hexagonal cells of the honeycomb structure, which constitute the skeleton of the honeycomb structure, must be firmly bonded together to form an integrated structure. To this end, in accordance with the present invention, a fusing material or strong adhesive is applied to the outer surfaces of the hexagonal pegs 14 of the shaped metal plates 2 and 6, prior to the overlapping of the shaped metal plates 2 and 6. When the shaped metal plates 2 and 6 are overlapped, as shown in FIG. 6, the hexagonal pegs 14 of the shaped metal plates 2 and 6 are firmly bonded by the fusing material or adhesive to form an integrated structure.

Furthermore, as shown in FIG. 7, the size of the honeycomb structure may be increased using a plurality of shaped metal plates, for example, by joining the shaped hexagonal cell metal plates in the manner of zigzag.

In order to enhance the connection of the hexagonal cell metal plates in the honeycomb structure produced as described above, and to improve the appearance of the honeycomb structure, flat plates 26 made of a material different from that of the hexagonal cell metal plates may be attached to the upper and lower surface of the honeycomb structure. In order to enable the flat plates 26 to be securely attached to the honeycomb structure, non-woven fabric sheets 24 may be attached to the honeycomb structure by means of adhesive, prior to the attachment of the flat plates 26. Thus, a honeycomb structure having a desired size and superior quality can be produced in accordance with attachment of flat plates of various materials.

In honeycomb structures produced in accordance with conventional methods, a releasing phenomenon may arise because the bonding area of the honeycomb core to the flat plates is too small. However, such a releasing phenomenon may be greatly reduced in the present invention because the bonding area of honeycomb core to the flat plates is large.

Furthermore, in accordance with the present invention, a honeycomb structure having dense hexagonal cells can be easily produced without using complicated processes, by forming hexagonal cell metal plates having hexagonal pegs, using moulds, and overlapping and coupling the hexagonal cell metal plates such that the protruded surfaces of the metal plates face each other.

In accordance with the method of the present invention, it is also possible to fabricate a firm honeycomb structure, using a metal material having a high compressive strength and a high bending strength.

The invention claimed is:

1. A method for producing a honeycomb structure, comprising the steps of:
   forming two hexagonal cell metal plates each having uniformly-spaced hexagonal pegs, using a mould and a press;
   applying a fusing material or strong adhesive to outer surfaces of the hexagonal pegs; and
   overlapping the metal plates such that surfaces of the metal plates, from which the hexagonal pegs are protruded, face each other, and coupling the metal plates such that adjacent ones of the hexagonal pegs of the metal plates are engaged, thereby producing a honeycomb structure having continuously joined cells.

2. The method according to claim 1, wherein the hexagonal pegs may be substituted with a pentagonal, square, triangular, or circular cross-sectional shape.

* * * * *